United States Patent [19]

Stropkay et al.

[11] Patent Number: 4,759,189
[45] Date of Patent: Jul. 26, 1988

[54] SELF-LIMITING THERMAL FLUID DISPLACEMENT ACTUATOR

[75] Inventors: George P. Stropkay, Gates Mills; Joseph A. Birli, Sr., Richmond Heights, both of Ohio

[73] Assignee: Design & Manufacturing Corporation, Willoughby, Ohio

[21] Appl. No.: 51,920

[22] Filed: May 19, 1987

Related U.S. Application Data

[63] Continuation-in-part of Ser. No. 803,636, Dec. 2, 1985, abandoned.

[51] Int. Cl.⁴ .................................................. F03G 7/06
[52] U.S. Cl. ......................................... 60/531; 60/527; 219/504; 219/513; 219/275
[58] Field of Search ............... 219/504, 505, 275, 276, 219/271, 513; 60/527–531

[56] References Cited

U.S. PATENT DOCUMENTS

| | | | |
|---|---|---|---|
| 3,187,164 | 6/1965 | Andrich | 219/504 |
| 3,400,252 | 9/1968 | Hayakawa et al. | 219/504 |
| 3,476,293 | 11/1969 | Marcoux | 222/146 |
| 3,991,572 | 11/1976 | Huebscher et al. | 60/531 |
| 4,016,722 | 4/1977 | Niederer, Sr. | 60/531 |
| 4,070,859 | 1/1978 | Sobecks | 60/530 |
| 4,104,507 | 8/1978 | Tisone et al. | 219/513 |
| 4,458,137 | 7/1984 | Kirkpatrick | 219/201 |

Primary Examiner—Allen M. Ostrager
Attorney, Agent, or Firm—Renner, Otto, Boisselle & Sklar

[57] ABSTRACT

A self-limiting electro-thermal actuator, capable of improved response time and continuous energization operation to produce a mechanical output uses plural heaters, e.g. a resistance heater and a positive temperature coefficient (PTC) heater, connected in series electrically. The actuator includes a boiler chamber, a thermally expansible working medium in the boiler chamber, a movable member responsive to expansion of the working medium to provide a mechanical output from the actuator, and a heater assembly for heating the working medium. The heater assembly includes the series-connected resistance electrical heater and PTC material heater. The electrical resistance of the PTC material increases with increasing temperature to limit current flow to the resistance heater. The heater arrangement produces improved response time over use of a PTC heater alone permitting actuators to be employed in applications for which known actuators are too slow.

11 Claims, 3 Drawing Sheets

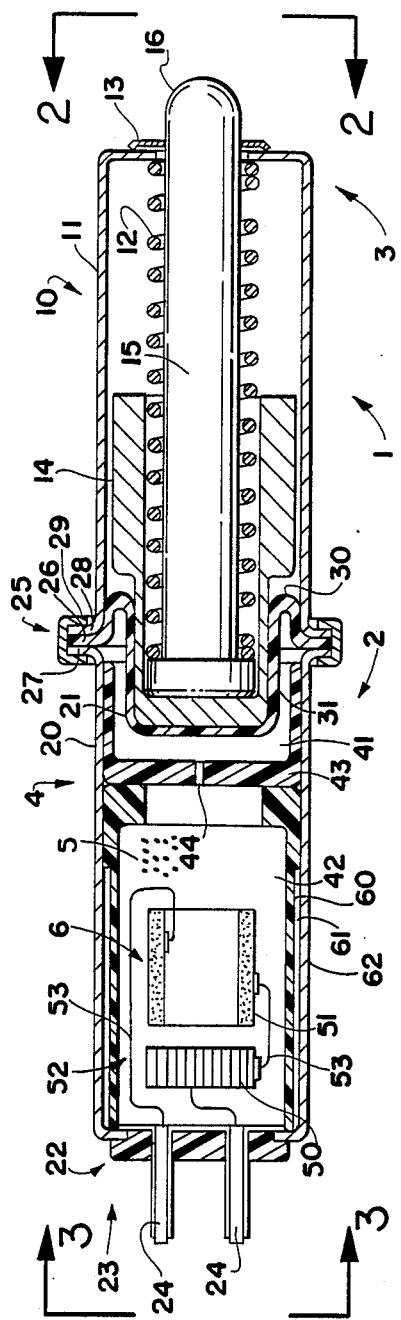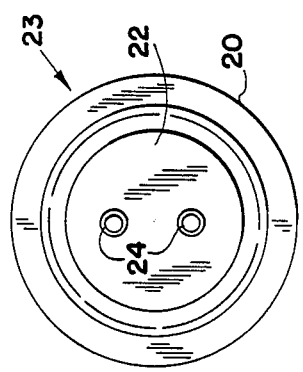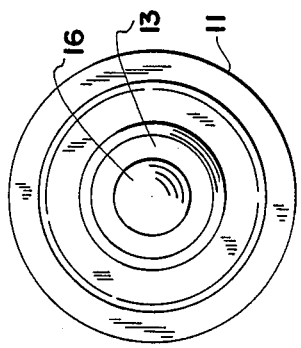

SELF-LIMITING THERMAL FLUID DISPLACEMENT ACTUATOR

CROSS REFERENCE TO RELATED APPLICATION

This disclosure is a continuation-in-part of U.S. patent application Ser. No. 803,636, filed Dec. 2, 1985, now abandoned.

TECHNICAL FIELD

The present invention relates generally to electro-thermal actuators and particularly to a fast-acting current-limiting electro-thermal linear actuator.

BACKGROUND OF THE INVENTION

Electro-thermal fluid displacement actuators that convert electrical energy into thermal energy and, in turn, employ the thermal energy to expand a thermally expansible medium to do work are known. One example of such an actuator is disclosed in U.S. Pat. No. 3,991,572.

In the '572 patent a thermally expansible and contractible medium is contained in a variable-volume chamber of the actuator. In response to heating, the medium expands, increasing pressure in and expanding the chamber, to force outstroking of a piston. The outstroking motion of the piston may be harnessed to do work on an external device.

Moreover, as is disclosed in the '572 patent, the medium may be a liquid that undergoes a liquid-to-gas phase change in response to heating and a gas-to-liquid phase change upon cooling. Other media capable of undergoing expansion and contraction, in particular due to a phase change, also are known. It will be appreciated that the various aspects of the present invention, as it is described in greater detail below, may be employed with various types of thermally expansible and contractible media, although the type that undergoes the phase changes described in the '572 patent are preferred.

The electric resistance heater used in the actuator of the '572 patent has an important advantage of speed of response. Specifically, in response to energization, the conventional resistance heater rapidly increases in temperature causing a correspondingly rapid expansion of the medium and outstroking of the piston. Moreover, the resistance heater includes an electrical conductor that may be disposed in a coil, spiral, helical, etc. configuration having a substantial surface area. The relatively large surface area expedites thermal energy transfer from the heater to the medium. However, electric resistance heaters are difficult to control. If sustained outstroking is not required a timer or other control is necessary to stop current flow at some point in order to prevent overheating and destruction of the heater. If sustained outstroking is needed, requiring maintenance of a constant heater temperature, an external thermostatic control is required. A thermostatic control can produce cycling in an actuator so that pressure in the actuator chamber and output force on the piston may vary over prolonged energization periods. In addition, a timer, actuator apparatus making it uneconomical in many potential applications.

Another thermal fluid displacement actuator is disclosed in U.S. Pat. No. 4,070,859. In the '859 patent, a positive temperature coefficient (PTC) resistance heater may be employed in an electrothermal linear actuator. Upon electrical energization of the PTC heater, the heater increases in temperature, heats the medium, effects the desired pressure increase and medium expansion, and causes outstroking of the actuator piston. PTC heaters have been used to solve temperature regulation difficulties in electro-thermal linear actuators. The PTC material exhibits a rapidly increasing electrical resistance at a characteristic anomaly or Curie temperature. At ambient temperatures the resistance of the PTC material is low. At the anomaly temperature PTC resistance is dramatically increased so that the current flow is substantially limited. As a result, an energized PTC heater is automatically maintained at about the anomaly temperature. A disadvantage of PTC heaters in thermal actuators, though, is their slow speed of response. A PTC heater heats at a much slower rate than fixed resistance heaters and, therefore, often is not suitable where rapid actuator response is needed.

Efforts have been made to try to optimize the response time and other characteristics of thermal fluid displacement actuators that use PTC heaters. One example is the use of plural PTC heaters electrically connected in parallel, disclosed in the '859 patent. Another example is the use of a hollow annular PTC heater, disclosed in U.S. Pat. No. 4,104,507.

The entire disclosures of the aforementioned '572, '859, and '507 patents hereby are incorporated herein by reference.

SUMMARY OF THE INVENTION

According to the present invention an electro-thermal linear actuator has a heater arrangement that includes both a conventional resistance heater and PTC material heater electrically connected in series and located in an actuator that contains a thermally expansible and contractible medium. The heater arrangement may be disposed in or out of the so-called boiler chamber of the actuator. The resistance heater provides rapid response to electrical input so that a rapid response to energization is produced. The PTC material provides temperature regulation and current limitation functions, permitting the actuator to be maintained in an energized condition for relatively long periods of time without damaging the resistance heater or the need for an expensive thermostat. The heater arrangement provides improved actuator response time compared to an actuator employing only a PTC heater. Once the desired temperature is reached, mainly from the heat generated by the conventional heater, the heat produced by the PTC heater produces most of the heat output necessary to maintain the outstroke of the actuator. The resulting combination provides improved, rapid response and continuous "on" operation of the actuator without risk of burning out the resistance heater, since the PTC heater limits current flow in the heater circuit at or about anomaly temperature.

Accordingly, it is a primary object of the present invention to provide rapid operational response and continuous operation of an electro-thermal actuator, preferably an electro-thermal linear actuator.

Another object is to protect a conventional heater in an electro-thermal actuator from self-destruction by overheating.

An additional object is to provide temperature regulation in an electro-thermal actuator.

A further object is to provide self-regulation of a heater assembly in an electro-thermal actuator while providing continuous out-stroke capability.

Still another object is to realize the rapid actuation response of an electro-thermal actuator having a resistance heater and incorporating temperature regulation without requiring external thermostatic controls.

These and other objects and advantages of the present invention will become more apparent in the following description.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

BRIEF DESCRIPTION OF THE DRAWINGS

In the annexed drawings:

FIG. 1 is a sectional side view of an electro-thermal linear actuator according to the present invention;

FIG. 2 is an end view of the actuator of FIG. 1 looking generally in the direction of the arrows 2—2 thereof;

FIG. 3 is an end view of the actuator of FIG. 1 looking in the direction of the arrows 3—3 thereof;

DESCRIPTION OF THE PREFERRED EMBODIMENT

Figure 4A:
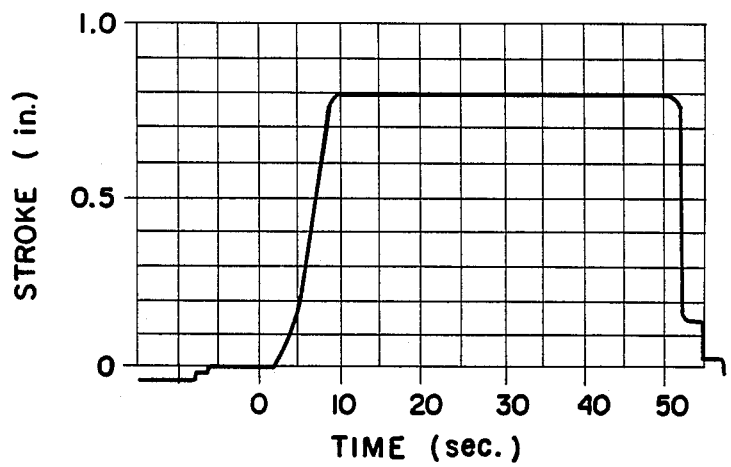
FIGS. 4A and 4B are graphs of the mechanical response time and current flow over time of a conventional actuator employing a PTC heater.

In the drawings like reference numerals designate like parts. In FIG. 1, an electro-thermal linear actuator in accordance with the present invention is generally designated 1. Although the invention is described in respect to an actuator that produces a linear mechanical stroke, the invention may be employed with other types of actuators that produce a mechanical response to the application of thermal energy to a thermally expansible and/or contractible working medium.

The actuator 1 includes a fluidic portion 2 and a mechanical portion 3, the former being selectively energizable to effect a mechanical output by the latter. More specifically, the fluidic portion 2 includes a chamber arrangement 4 containing a working medium 5 and a heater assembly 6. The mechanical portion 3 includes a piston assembly 10 movable with respect to a hollow cylindrical end cap 11 of the actuator, a return spring 12, which ordinarily urges the piston assembly to the instroke position, and a stop washer 13 (the end view of which is seen in FIG. 2), which ordinarily limits the maximum instroke position of the piston assembly. The piston assembly 10 is formed of a piston 14 and a piston rod 15, which are urged into engagement with each other by the spring 12. Piston rod 15 may be moved relative to piston 14 if the piston rod is pulled at its exposed end 16 away from the piston 14.

The chamber arrangement 4 is formed and bounded by a hollow cylindrical actuator housing 20 having an annular rolling elastomeric diaphragm 21, for example of the type disclosed in the incorporated patents. Diaphragm 21 is disposed at one end of chamber 4 adjacent the mechanical portion of the actuator 1. A fluid-tight seal 22 (an end view of which is seen in FIG. 3) is disposed at the other end 23 of chamber 4. Electrical terminals 24 pass through seal 22 for electrically energizing the heater assembly 6. The housing 20 and end cap 11 are connected to each other at a junction 25. At junction 25 a flange 26 of the diaphragm 21 is forcibly held between respective flanges 27, 28 of the end cap 11 and housing 20 by a clip-like crimp ring 29. Ring 29 forms a fluid-tight seal for the chamber arrangement 4. The diaphragm has an annular fold 30 along which it may roll during operation of the actuator 1. The diaphragm also has a cylindrical part 31 into which the piston 14 may fit to give support to the diaphragm and to slide linearly along the path defined by the end cap 11 as the diaphragm rolls along the fold 30.

The chamber arrangement 4 is divided into two sections 41, 42 by a barrier 43 having one or more ports 44 therethrough. The chamber section 41 is a variable volume chamber capable of expanding and contracting in overall volume as a function of the position of the piston assembly 10 and the elastomeric rolling diaphragm 21. The other chamber section 42 is of fixed volume having the heater assembly 6 therein and is referred to as the boiler chamber. The separation between the chambers provided by the barrier 43 increases longevity of the diaphragm 21 by reducing direct contact between the fluid and diaphragm, reduces fluid permeation through the diaphragm, and reduces response time of the actuator, as is described, for example, in the '859 patent. It is preferred that the chamber be divided into two sections. However, the features of the invention may be employed in electro-thermal actuators that do not have a chamber separation or that have more than two chamber sections. Additionally, it will be appreciated that means other than an annular rolling diaphragm may be used to close the variable volume section 41 of the chamber arrangement 4 to maintain the desired fluid-tight sealing of the chamber and to transfer force to and from the piston assembly 10.

The heater assembly 6 of the present invention includes two distinct components, one a conventional resistance heater 50 and the other a PTC heater 51. The two parts of the heater assembly are connected in electrical series circuit 52 by leads 53 and terminals 24 to a source of electrical power. The fixed resistance heater 50 preferably is a spiral or helical wound electric resistance heater material, e.g. of the type disclosed in the '572 patent. Resistance heater 50 is capable of relatively rapid heating in response to the flow of an electric current through it. The wound configuration of the heater 50 increases the surface area exposed to the medium 5 for efficient heat transfer to and from the medium. Rapid heating of the medium 5 in the boiler chamber 42 effects a pressure increase in the chamber 4 and outstroking of the piston 10.

The PTC heater 51 at relatively low temperature provides a relatively low impedance path in electrical circuit 52 that includes resistance heater 50. However, as the temperature of the fixed resistance heater 50 increases, the temperature and impedance of the PTC material increase. The increased impedance of the PTC material limits current flow in the energization circuit 52, thus limiting current in and temperature of the resistance heater 50. The current and temperature limiting function prevents the fixed resistance heater from excessive heating and burn-out.

Current flowing through the circuit 52 will cause heating in both the fixed resistance heater 50 and the PTC heater 51. After the initial heating of the medium, attributable principally to the rapid heating of resistance heater 50, the PTC heater contributes to the overall heating function in the actuator 1. In fact, because of the substantial increase in the resistance of PTC heater 51 after the anomaly temperature is reached, the relative heat contribution of resistance heater 50 decreases substantially. Most of the heat that maintains the medium at a temperature that ensures the continued outstroke positioning of the piston is contributed by PTC heater 51. PTC heater 51 maintains a substantially constant temperature near the anomaly temperature in the boiler chamber 42, while limiting current flow through the fixed resistance heater to prevent heater 50 from burning out. PTC heater 51 may be a chip, wafer, tube or cylinder of PTC material.

A sleeve 60 preferably is provided as a liner along the cylindrical walls of the actuator chamber 42. Liner 60 preferably is a plastic or plastic-like thermal insulation to retain heat in the boiler chamber 42 and to minimize the energy required to maintain the actuator 1 energized and piston 10 in outstroked condition. The sleeve 60 defines an air gap insulation space 61 between it and actuator housing wall 62 to improve the thermal insulation characteristics.

As is seen in FIG. 1, the two heaters 50, 51 of the heater assembly 6 preferably are positioned such that the fixed resistance heater 50 is located closer to the end 23 of the actuator 1. In this way the actuator 1 may be operated in an upright position such that the piston outstroking would be in an up direction along a generally vertical axis. In that orientation, liquid working medium contained in the chamber arrangement 4, more specifically the boiler chamber 42, would fall to the bottom end 23 of the actuator chamber. Ordinarily the resistance heater 50 would be fully submerged in the medium, particularly during times of energization in order to cool the resistance heater 50. On the other hand, the PTC heater 51 is located more remote from the actuator chamber bottom 23 than is the fixed resistance heater 50. The PTC heater can withstand energization without immersion in liquid for cooling better than the resistance heater can. However, for maximum operational efficiency it is desirable that at least part of the PTC heater be fully submerged in the liquid phase working medium. However, neither of the heaters 50, 51 requires submersion in the working medium for operation of the actuator. Since the PTC heater limits both the temperature of and the amount of current flowing in the heaters, it can avoid heater burn-out even without heater submersion.

A preferred working medium 5 for the electro-thermal actuator 1 is a fluid that is capable of undergoing a liquid-to-gas phase change in response to heating to increase the pressure in the chamber 4 and out-stroking of the piston 10. That fluid is also capable of undergoing a gas-to-liquid phase change upon cooling to reduce the pressure in the chamber 4 and to effect instroking of the piston 10.

In operation of the electro-thermal actuator 1 of the invention, application of electric power to the terminals 24 will cause rapid heating of the resistance heater 50. Heater 50 rapidly heats the liquid 5 in the boiler chamber 42 to convert at least some of the liquid to a gas. The phase change increases the pressure in the chamber 4 and initiates outstroking of the piston 10. Current flowing through the PTC material 51 heats it, as does the heat emitted by the fixed resistance heater 50. Accordingly, the impedance of the PTC material increases, as the PTC material also contributes to the heating of the working medium in the chamber 42. Heating of the PTC material 51 will cause a gradual increase in its impedance until the anomaly temperature is reached. At the anomaly temperature the impedance of the PTC material increases sharply, substantially limiting current flow through the circuit 52 including the two heaters 50, 51. Adequate current will continue to flow and adequate heating will continue to occur, however, to maintain the temperature in the boiler chamber 42 and pressure in the chamber arrangement 4 substantially constant, holding or forcing piston 10 in its outstroked condition. Upon deenergization of the heater assembly 6, the working medium 5 will cool, condense, and reduce the pressure in the chamber 4 permitting instroking of the piston 10 in response to the spring 12.

Figure 4B:
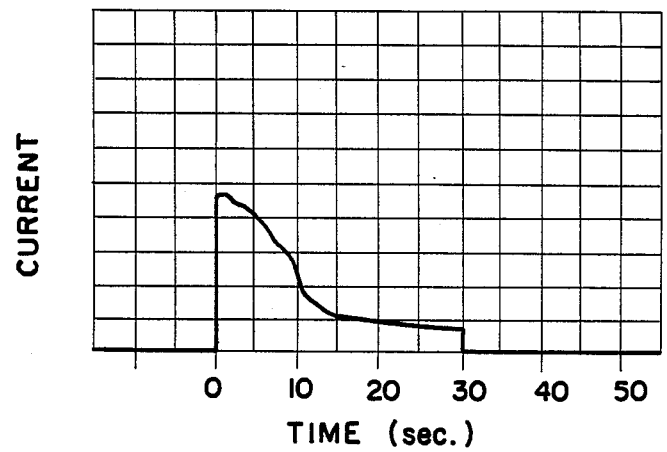

The substantial improvement achieved through the invention in actuator response time without the necessity of an expensive current control timer or thermostat is illustrated in FIGS. 4A, 4B, 5A, 5B, 6A and 6B. In FIGS. 4A and 4B the measured actuator repsonse time and current flow, both as a function of time, are shown, respectively, for a conventional, commercially used actuator subjected to a constant six pound load. This actuator has an outstroke of 0.8 inch and solely a PTC heater. (The vast majority of actuators now in use employ PTC heaters, sacrificing response speed for cost savings by avoiding the necessity of a current limiting timer or thermostat.) From the time current begins flowing until the actuator piston first reaches full outstroke, 9.5 seconds elapse. The current flow initially rises rapidly, but the PTC current limiting effects begin to reduce current flow after about two seconds, slowly response.

Figure 5A:
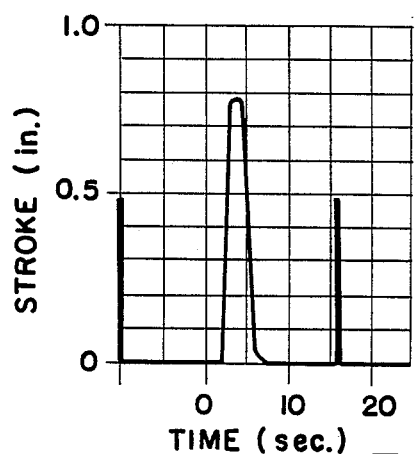
FIGS. 5A and 5B are graphs of the mechanical response time and current flow over time of a conventional actuator employing a resistance heater.
Figure 5B:
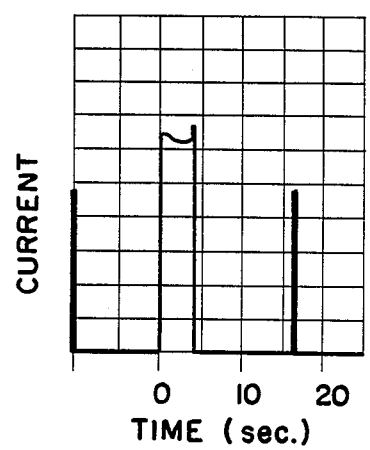

In FIGS. 5A and 5B the measured actuator response and current flow, as a function of time, respectively, are plotted for a conventional actuator employing solely a resistance type heater. The actuator outstroke is again 0.8 inch and the piston was loaded with an eight pound constant load. The actuator reaches full outstroke about 4 seconds after current begins flowing through the heater. Current flow is near constant, the ideal waveform, but remains high, even after full actuation. Current flow is promptly terminated in FIG. 5B to avoid damaging the resistance heater.

Figure 6A:
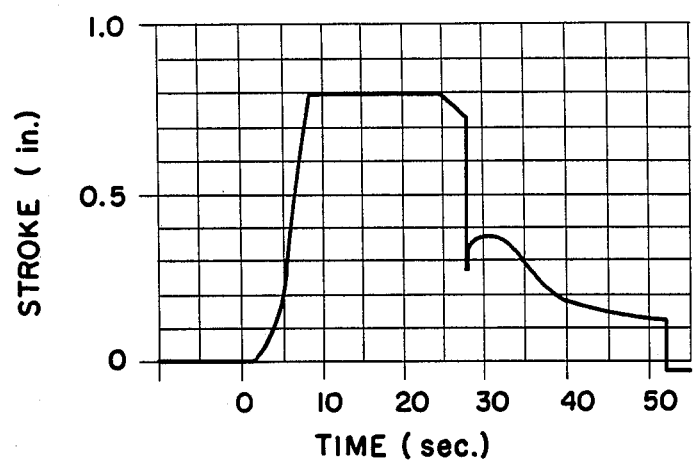
FIGS. 6A and 6B are graphs of the mechanical response time and current flow over time of a novel actuator according to an embodiment of the invention.
Figure 6B:
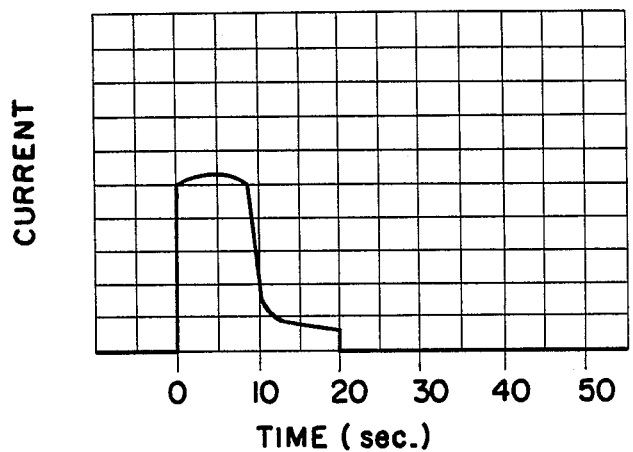

FIGS. 6A and 6B, respectively, show measured actuator response time and current flow, as a function of time, for an actuator of the same type as shown in FIGS. 4A and 4B, but modified to incorporate a series connected resistance heater and PTC heater in accordance with the invention. These graphs show, after several preliminary actuations to stabilize the heaters, that full actuator piston extension is achieved in 8.5 seconds, an 11 percent improvement over the conventional unit employing a PTC heater alone. Moreover, nearly all the current flow, see FIG. 6B, takes place over a ten second interval. Unlike the conventional PTC heater-only model of FIGS. 4A and 4B, and like the resistance heater-only model of FIGS. 5A and 5B, the novel actuator utilizes a relatively heavy, sustained initial current flow to achieve actuation. But unlike the resistance heater, current flow promptly decreases to a low level to sustain piston actuation without danger of damage to the heater.

The results of FIGS. 6A and 6B were measured for an actuator assembled from existing parts rather than a newly designed actuator that optimizes the advantages of the invention. By designing a specific actuator for the combination PTC and resistance heater further response time improvements, on the order of 40 to 50 percent compared to existing actuators, may be expected.

The rapid response and low cost of an actuator according to the invention allows the novel actuator to be employed in applications formerly prohibited by cost and/or slow response time. For example, actuators according to the invention can be used in electrically actuated vehicular door locks, vehicular radiator louvers and air conditioner controls. In vehicular applications, these novel actuators can replace vacuum driven apparatus and eliminate the need for fluid pressure lines and accumulator tanks.

We claim:

1. A self-limiting, electro-thermal actuator comprising a boiler chamber for containing a thermally expansible working medium capable of expansion upon heating, a movable member responsive to expansion of the working medium to provide a mechanical output from the actuator, and a heater assembly disposed in said boiler chamber to emit heat in response to current flow therethrough for heating said working medium, said heater assembly including a resistance electricl heater and a PTC material heater electrically connected in series, whereby the response time of the actuator is improved over use of a PTC material alone and said PTC material heater ultimately limits current flow to protect said resistance heater from excessive temperatures.

2. The actuator of claim 1, said PTC material heater having an anomaly temperature characteristic above which temperature the resistance rapidly increases with temperature, whereby said PTC material substantially limits the temperature in the chamber to approximately said anomaly temperature.

3. The actuator of claim 1, said PTC heater comprising an annular heater.

4. The actuator of claim 1, said resistance heater comprising a spirally wound electrical conductor.

5. The actuator of claim 1, said moveable member comprising a linearly slidable piston.

6. The actuator of claim 5, comprising an elastomeric rolling diaphragm closing one end of said boiler chamber, said piston being positioned with respect to said diaphragm to move in response to pressure changes in said boiler chamber deflecting said diaphragm.

7. The actuator of claim 1, said boiler chamber comprising fluid seal means for passing electrical connections between said boiler chamber and the exterior of the actuator for connection of a current source to said heater assembly while maintaining a fluid-tight sealing of said boiler chamber.

8. The actuator of claim 1, said working medium comprising a fluid that undergoes a liquid-to-gas phase change in response to increasing temperature.

9. The actuator of claim 1, comprising insulating means disposed in said boiler chamber for retaining heat in said chamber.

10. The actuator of claim 1, comprising a variable volume fluid chamber fluidically coupled to said boiler chamber, an elastomeric diaphragm at least partially defining said variable volume chamber, said diaphragm being responsive to pressure changes in said chamber to move said movable member.

11. The actuator of claim 1, comprising barrier means for separating said boiler chamber and said variable volume chamber, and fluid flow means in said barrier means for permitting fluid communication between said chambers.

* * * * *